March 11, 1958  W. H. KLIEVER  2,826,072
CONTROL APPARATUS
Filed June 8, 1953
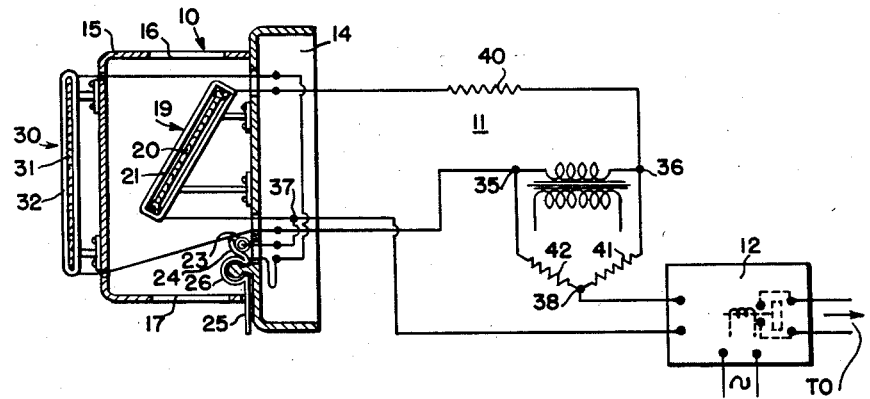
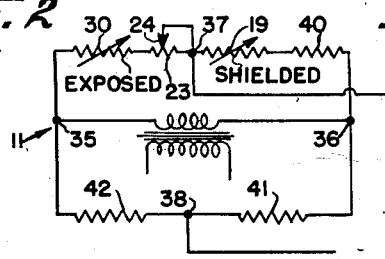
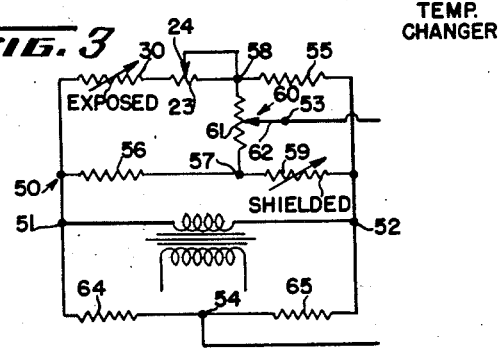
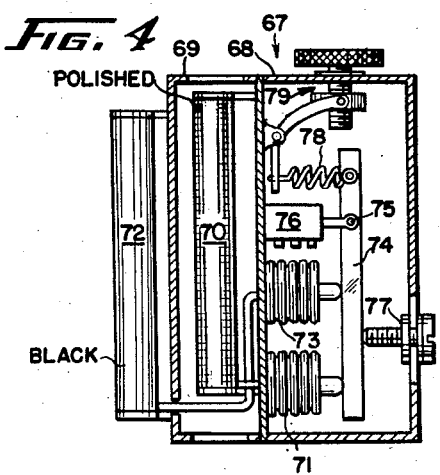
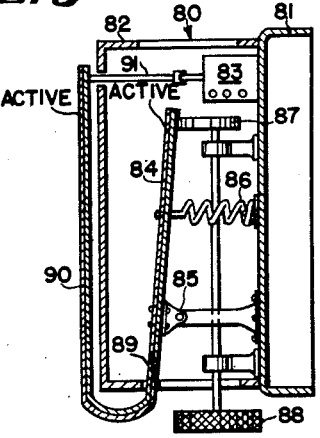
*INVENTOR.*
WALDO H. KLIEVER
BY George H. Fisher
*ATTORNEY*

2,826,072
CONTROL APPARATUS

Waldo H. Kliever, Minneapolis, Minn., assignor to Minneapolis-Honeywell Regulator Company, Minneapolis, Minn., a corporation of Delaware Application June 8, 1953, Serial No. 360,303

4 Claims. (Cl. 73—355)

The present invention relates to improved thermostatic means responsive to radiation as well as air temperature.

It is well known that the ordinary comfort heating or air conditioning system functions, not by actually warming a person but by controlling his heat loss. It is further known that a normal rate of heat loss for a sedentary person, excluding evaporation, is approximately 300 B. t. u. per hour with about 190 B. t. u. being lost by radiation and about 110 B. t. u. being lost by convection, evaporation being ignored in this discussion because the loss by evaporation is fairly constant for indoor winter conditions. It is clear from this that radiation effects should take a prominent part in any comfort control apparatus, but the devices now available are relatively non-responsive to radiation. Radiation responsive devices have been made but it has been calculated, and determined experimentally, that a black ball thermostat, to give a proper ratio of response between radiation and air temperature, should be about 9 inches in diameter. This is obviously an impractical solution for most applications.

I have found that a proper response to radiation and air temperature may be obtained by exposing a thermally responsive element to both radiation and air temperature and then cancelling out a portion of its response to air temperature by another element exposed only to air temperature and arranged to modify the action of the first named element, the resultant of these two elements thus being used for the controlling purposes.

It is thus an object of this invention to provide an improved controller responsive to both radiant and air temperature effects.

A study of the following specification and drawings will show specific apparatus for attaining this and other objects, it being understood, of course, that the following examples are illustrative only.

Figure 1 is a schematic view showing a preferred embodiment of the present invention.

Figure 2 is a wiring diagram of the network used in Figure 1.

Figure 3 is a wiring diagram of a modified network useful in the apparatus of Figure 1.

Figure 4 is a sectional elevation view of a modified form of apparatus using a fluid fill thermostatic means.

Figure 5 is a sectional elevation view of another modified apparatus using bimetal for the thermostatic means.

In Figure 1, a controller 10 is connected in a network generally designated by 11, the network being connected to the input terminals of a suitable relay means, such as an electronic amplifier 12, to control a temperature changing device, not shown. The relay means 12 is of any conventional form but, for the purpose of this illustration, is assumed to be an electronic amplifier having a relay in the output portion of its circuit although, as is well known to those skilled in this art, other forms of control devices, relays or amplifiers may be used to convert the small signals from network circuit 11 to an output suitable for use in controlling apparatus such as temperature changing equipment.

The thermostatic controller 10 comprises a base portion 14 and a conventional cover 15 having upper slots 16 and lower slots 17 for permitting air movement therethrough. Mounted on base 14 and in general alignment with slots 16 and 17 is a temperature responsive impedance element 19 comprising a base member 20 and a winding 21 of wire having a relatively high temperature coefficient of resistance, such as nickel. Also, a longitudinally extending resistor 23 of a rheostat is attached to base 14 and is contacted by wiper 24 forming part of an adjusting lever 25 of the rheostat movable longitudinally along a guide means 26 arranged on said base. As thus far recited, the thermostat including the base, cover, impedance element and rheostat amounts to a conventional resistance type thermostat used with electronic temperature controlling systems as now sold commercially. This particular device, however, also has a further impedance element 30 spaced from the front face of the cover, this impedance element including a core member 31 and a winding 32 of resistance wire having a relatively high temperature coefficient similar to that of wire 21 and, for purpose of illustration, nickel. This exposed element, for maximum efficiency, presents a relatively "black" surface to all of the objects that can be "seen" by the element. While black bodies are customarily thought of in terms of color, it should be kept in mind that the term "black" is used in a functional sense only and denotes that the surface finish or the like is highly absorptive of the wave bands of heat radiation likely to be present in the space being controlled by the present apparatus. Thus, it appears that it is not necessary to have a jet black color for high radiation absorption from surfaces having temperatures lower than about 200° F., the conditions of radiation such as found in an ordinary residence.

Device 10 is connected into network 11 in a manner best shown in Figure 2 wherein terminals 35 and 36 represent power input terminals to the network and terminals 37 and 38 represent the output terminals which are, as shown in Figure 1, connected to the relay means 12. The upper left hand portion of this network will then be seen to comprise impedance element 30 and the effective portion of resistor 23 of the adjusting rheostat, the impedance value of this rheostat being ignored for the moment because, since it is a calibrating device only, it takes no part in the actual functioning of this apparatus. The upper right hand portion of the network comprises impedance element 19 and a fixed resistor 40. The lower right hand portion of the network comprises a fixed resistor 41 and the lower left hand portion of the network comprises a fixed resistor 42.

Assuming that this bridge circuit is to be balanced at a predetermined temperature wherein each branch of the bridge will have about 500 ohms resistance, it will appear that resistor 30 plus the few ohms of the rheostat will provide the required 500 ohms. Likewise, the resistance of element 19 plus that of 40 will be 500 ohms and both of the fixed resistors 41 and 42 will be of 500 ohms each. Assuming, however, that about 40% of the response of element 30 is due to radiation and the remaining 60% due to air temperature effects, and that, to be effective in the manner desired, the radiation response must be improved to the extent that 190/300 of the response is to radiation, it may be calculated that resistor 19 should have 184 ohms resistance and fixed resistor 40 should have 316 ohms resistance. With this arrangement, it then appears that the 40% response of element 30 to radiation is equivalent to 200 ohms 100% responsive to radiation and 300 ohms 100% responsive to convection or air temperature effects. Then, with 184 ohms of this 300 ohms offset or cancelled out by the resistor 19 in the right hand portion of the bridge, the net effect of the convection response of element 30 amounts to 116 ohms and the ratio of 200 to 116 will be seen to be substantially the same as 190 to 110, the ratio of radiant heat loss to convection heat loss of the sedentary human being previously mentioned.

While the desired ratio of response was obtained in this illustration by making elements 30 and 19 of the same sort of material and then making the resistance of element 19 substantially less than that of 30, the same overall results can be obtained by combining resistors 19 and 40 and then making the overall resistor of a different material having a proper and lesser temperature coefficient of resistance.

Instead of network 11, as just described, a slightly different network 50, shown in Figure 3, may be used, this network having power input terminals 51 and 52 and output terminals 53 and 54, similar to the previous network. In addition, this network includes an element in the upper left hand portion such as 30 and an adjusting rheostat including a resistor 23 and a wiper 24, the wiper and resistor of the rheostat being connected to a terminal 58 which is also connected to an upper right hand portion 55 of the network 50 comprising a fixed resistor of 500 ohms, for example. A second parallel portion of the network comprises a left hand fixed resistor 56 which may, for convenience, also be of 500 ohms resistance and this resistor is joined at terminal 57 to a temperature responsive resistor 59, corresponding to element 19 in the previous description, with the element being similar in resistance to element 56 and having a temperature coefficient, for this illustration, the same as that of element 30. Actually, as above explained, this element may have a lesser temperature coefficient value if desired. A voltage dividing potentiometer 60 comprising resistor 61 connected between terminals 58 and 57 has a wiper 62 connected to output terminal 53. A lower portion of the network comprises fixed resistors 64 and 65, corresponding to resistors 42 and 41 of the aforementioned network, these resistors being joined by terminal 54 of the network. With the arrangement just shown, the proportionate effect of resistors 30 and 59 may be varied by moving wiper 62 along resistor 61. As will be apparent, when wiper 62 is adjusted to the upper portion of resistor 61, element 30 has a relatively full effect on the bridge and resistor 59 has very little effect whereas, when wiper 62 is near the bottom of resistor 61, element 59 has a great deal of influence and element 30 has very little. Thus, by adjusting wiper 62 along resistor 61, any desired degree of proportional response from the two temperature responsive resistors is easily obtained.

The present invention may be carried out by other means than shown above and Figure 4 illustrates one such modification. In this figure, the device 67 comprises a base portion 68 and a cover portion 69, the cover portion having slots at the top and bottom for passage of air therethrough, as is conventional. Mounted inside the cover 69 is a bulb 70 having a highly polished surface and connected by a capillary tube to a bellows 71 to form a first thermostatic element. A second thermostatic element comprises a "black" bulb 72 connected by a capillary tube to bellows 73 to thus form a second thermostatic element, each of said bellows exerting a force in accordance with the temperature of its respective bulb. It will be noted that the polished bulb is also shielded by the cover 69 whereas the black bulb 72 is fully exposed on the outside of the device and thus is able to "see" radiating objects within its range. Bellows 71 and 73 are both operative to adjust a lever 74 pivotally attached at 75 to a snap switch 76, snap switch 76 being of any suitable sort having a plunger type actuator and preferably having both in and out contacts so that it can be used for either a heating or cooling sequence. While lever 74 is pivotally attached to the actuator of snap switch 76, or other control device, at 75, the lever also pivots about an adjustable pivot member 77 arranged between the abutment portions of bellows 71 and 73 so that the resultant of the bellows forces is available for operating switch 76. A torsion spring 78 is adjustable by means of a mechanism 79 to vary the resultant pressure that must be exerted by bellows 71 and 73 to operate switch 76 and thereby varies the control point of the device. By properly adjusting pivot 77 so that the bellows 71 can offset a desired portion of the force exerted by bellows 73, and thus cancel out part of the air temperature effects on bulb 72, this apparatus may be thus adjusted to give a ratio of response to radiation and air temperature similar to that of the above electrical apparatus. While bulb 70 is disclosed as being highly polished, this is merely a further refinement and, to the extent that the bulb 70 is fully protected from radiation by cover 69, the polishing of the bulb may be omitted. Also, as will be obvious from the above discussion, bulb 72 need only be black to the radiation temperatures expected in the space being controlled.

A further modification of the present apparatus is shown in Figure 5 and comprises a controller 80 having a base 81 and a cover 82 with the customary slots in the top and bottom portion of the cover. Likewise, a snap switch 83 having a reciprocable operating plunger and preferably having both in and out contacts, so that both heating and cooling sequences can be controlled, is attached to the base 81. A strip of bimetal 84 is pivotally attached at 85 to the base 81 and is biased to the right by a tension spring 86, this spring being only strong enough to keep the bimetal 84 in contact with an adjusting cam 87 operable by the control point adjusting knob 88. Bimetal 84 is arranged so that its active or most expansive side faces to the left, in the drawing. Attached to the bimetal 84 by a lap joint 89 is a second piece of bimetal 90 which extends around the bottom edge of the cover and up the front face of the thermostat 80, and this bimetal is arranged so that its active face is also to the left, it thus being clear that, if bimetals 84 and 90 were of similar length and characteristics, the net air temperature effect from them would be zero. In the present case, however, element 90 is appreciably longer than 84 and is exposed to both radiation and convection. The upper end of element 90, through a push rod 91, operates the switch 83, and this operation will be due to the radiation and convection effects on 90 reduced by the convection effects on element 84, element 84 being protected from radiant effects. Thus, controller 80 is essentially similar to the other apparatus described above.

In each case, it has been shown that a proper response by a controller to a plurality of conditions can be obtained by making one element responsive to the plurality of conditions and then obtaining a proper ratio of response by offsetting the response of the first element by another element responsive to one of the conditions. More specifically, a desired ratio of response to radiation and air temperature may be obtained by exposing a temperature responsive means to the radiant and convection effects in a space and then offsetting the response of this means by another means protected from radiation but responsive to the convection effects, with the amount of offset being proportioned to give the resultant effect desired.

As many substitutions and equivalents will become apparent upon a study of this specification and drawings, the scope of the invention should be determined only by the appended claims, wherein

I claim:

1. In a thermostat sensing the combined effects of heat radiation and air temperature in a space for controlling a temperature changing device, a base member adapted to be mounted on a wall in the space, a cover attached to said base member and having oppositely disposed openings providing for the free flow of air therethrough, a first temperature responsive means, means for mounting said first responsive means on said cover outside thereof so that said first means is responsive to heat radiation through the space and to the ambient air temperature in the space, second temperature responsive means, means for mounting said second means between said cover and said base member so that the heat radiation of said second means is substantially reduced and it is substantially at the temperature of the ambient air in the space, and connection means connecting the outputs of said first and second responsive means in opposition so that the output of said second responsive means cancels a portion, but not all, of the output of said first responsive means resulting from the effect of ambient air temperature, said connection means being such that the resulting output of said first and second responsive means have the predetermined proportions of the effect of heat radiation and ambient air temperature on the heat losses of the human body to provide maximum comfort, and connection means adapted to connect said combined output to control the temperature changing device.

2. In a thermostat sensing the combined effects of heat radiation and air temperature in a space for controlling a temperature changing device, a base member having an outer wall and means for mounting the same on a wall in the space, a first temperature responsive means, means for mounting said first responsive means exteriorly of said outer wall of said base member so that said first means is responsive to heat radiation outward through the space from said base and to ambient air temperature in the space, the outer wall of said base member including a shield to provide a region substantially shaded from heat radiation and through which the space air may freely flow, second temperature responsive means, means for mounting said second means on said base member in said substantially shaded region so that said second means is responsive to the ambient air temperature as the free flowing air passes thereby, and connection means connecting the outputs of said first and second responsive means in opposition so that the output of said second responsive means cancels a predetermined portion of the output of said first responsive means resulting from the ambient air temperature, said connection means being such that the resulting output of said first and second responsive means have the proportions of the effect of heat radiation and ambient air temperature on the heat losses of the human body to provide maximum comfort, and connection means adapted to connect said combined output to control the temperature changing device.

3. In a thermostat, a base member having an outer wall which will not readily transmit heat radiation therethrough and means for mounting the same on a wall in the space, a first temperature responsive means responsive to heat radiation and ambient air temperature of a space, means for supporting said first responsive means exteriorly of said outer wall so that said first responsive means is exposed to heat radiation through said space, second temperature responsive means, said base member having shielding means providing a region substantially shaded from heat radiation and through which the space air may freely flow, means for mounting said second means on said base member in said region so that said second means is responsive to the ambient air temperature of the space, and connection means connecting said first and second responsive means in opposition so that the output of said second responsive means cancels a predetermined portion of the output of said first responsive means.

4. In combination, a first temperature responsive means, a base member having an outer wall and mounting means for mounting same on a wall in a space, means for mounting said first temperature responsive means exteriorly of said outer wall of said base member, said responsive means being responsive to heat radiation through said space and to ambient temperature of the space, a second temperature responsive means, means for mounting said second responsive means in such a location that said second means is responsive to the ambient air temperature of the space and substantially unaffected by heat radiation, and connection means connecting the outputs of said first and second responsive means in opposition so that the output of said second responsive means cancels a predetermined portion of the output of said first responsive means resulting from the ambient air temperature effect, said connection means being such that the resulting outputs of said first and second responsive means have the proportions of the effect of heat radiation and ambient air temperature on the heat losses of the human body thereby providing maximum comfort for the occupants of the space.

References Cited in the file of this patent

UNITED STATES PATENTS

| | | |
|---|---|---|
| 1,099,199 | Parker | June 9, 1914 |
| 2,021,573 | Alder | Nov. 19, 1935 |
| 2,125,627 | Fonseca | Aug. 2, 1938 |
| 2,192,633 | Beam | Mar. 5, 1940 |
| 2,247,539 | Winfield | July 1, 1941 |
| 2,275,368 | Krause | Mar. 3, 1942 |
| 2,349,436 | Keeler | May 23, 1944 |
| 2,398,333 | Shoemaker | Apr. 9, 1946 |
| 2,403,843 | Beam | July 9, 1946 |
| 2,444,733 | Gille | July 6, 1948 |
| 2,537,315 | Newton | Jan. 9, 1951 |
| 2,556,065 | Callender | June 5, 1951 |
| 2,565,249 | Machler | Aug. 21, 1951 |
| 2,598,808 | Ledin | June 3, 1952 |
| 2,602,591 | Wilson | July 8, 1952 |
| 2,666,089 | Gier | Jan. 12, 1954 |